United States Patent [19]

Makuch

[11] 4,177,951

[45] Dec. 11, 1979

[54] PULVERIZER AIR FLOW AND TEMPERATURE CONTROL

[75] Inventor: John A. Makuch, Granby, Conn.

[73] Assignee: Combustion Engineering Inc., Windsor, Conn.

[21] Appl. No.: 919,756

[22] Filed: Jun. 28, 1978

[51] Int. Cl.$^2$ ............................................. B02C 25/00

[52] U.S. Cl. ...................................... 241/35; 241/65; 241/17; 241/23

[58] Field of Search ....................... 241/33, 17, 34, 21, 241/65, 23, 35

[56] References Cited

U.S. PATENT DOCUMENTS

| | | | |
|---|---|---|---|
| 2,335,853 | 12/1943 | Frisch | 241/33 |
| 2,427,903 | 9/1947 | Crites | 241/33 |
| 2,428,422 | 10/1947 | Harvey | 241/33 |
| 2,831,637 | 4/1958 | Mittendorf | 110/106 X |
| 2,998,200 | 8/1961 | Litwinoff | 241/33 |
| 3,043,525 | 7/1962 | Gilbert | 241/33 X |
| 3,078,048 | 2/1963 | Russell et al. | 241/33 X |
| 3,273,520 | 9/1966 | Hottenstine | 110/106 X |

*Primary Examiner*—Robert L. Spicer, Jr.

[57] ABSTRACT

The flow of preheated and ambient air to a processor, such as a coal pulverizer, are controlled in a manner whereby the preheated air flow will be varied as a function of pulverizer discharge temperature air while "cold" ambient air flow will be varied as a function of pulverizer inlet air mass flow rate. Flow error signals are caused to vary as a function of temperature error to enhance system response to temperature errors, and flow error will be caused to take precedence over temperature error should pulverizer inlet flow fall below a predetermined minimum.

10 Claims, 1 Drawing Figure

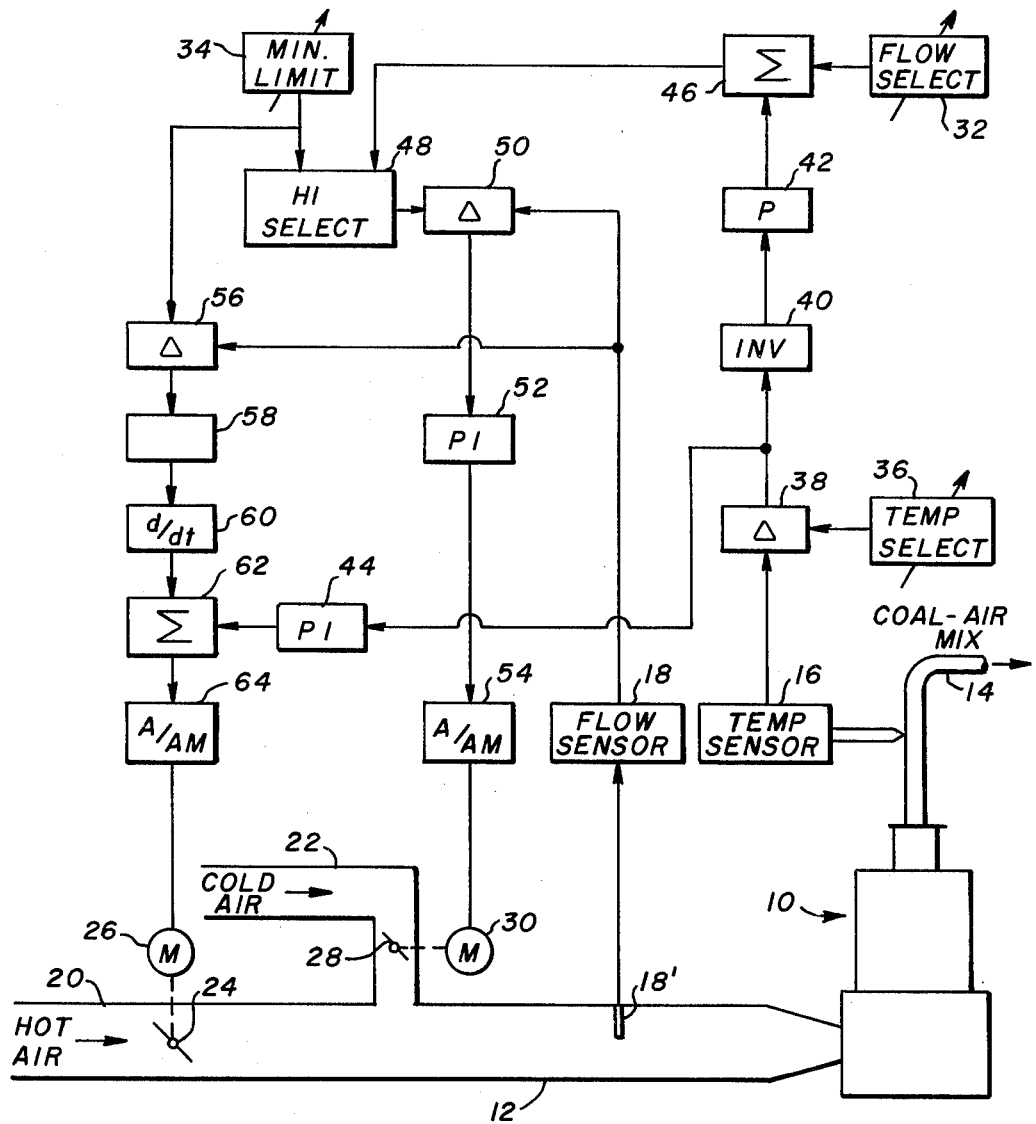

PULVERIZER AIR FLOW AND TEMPERATURE CONTROL

BACKGROUND OF THE INVENTION (1) Field of the Invention

The present invention relates to the exercise of control over the quantity of at least a pair of constituents of a mixture so as to satisfy quantity and/or temperature requirements dictated by equipment located downstream of the mixing point of the constituents. More specifically, this invention is directed to an air flow and temperature control for a pulverizing mill of the type which receives undried coal and discharges a fuel stream consisting of dry pulverized coal entrained in air. Accordingly, the general objects of the present invention are to provide novel and improved methods and apparatus of such character.

(2) Description of the Prior Art

While not limited thereto in its utility, the present invention is particularly well suited for use in the exercise of control over a pulverizing mill of the type employed by utilities to grind coal, delivered thereto from storage bunkers which may be exposed to the weather, to provide a fuel stream for injection into the furnace of a steam generator. Techniques and apparatus for controlling the flow rate and temperature of primary air which dries and then conveys fuel from a pulverizing mill to the burners of a vapor generator furnace are known in the art. The prior art controls are exemplified by U.S. Pat. No. 2,831,637 to H. C. Mittendorf et al and U.S. Pat. No. 3,273,520 to R. D. Hottenstine.

The air entering a coal mill or pulverizer must satisfy two basic criteria. First, it must be of sufficient quantity to provide adequate transport velocity for the fuel stream which exits the pulverizer. Secondly, the air must have sufficient heat content to dry the coal in the pulverizer. The air delivered to a pulverizer is known in the art as "primary air". In the prior art, as well as in the present invention, a portion of this primary air is at ambient temperature and is referred to as the "cold" air. The remainder of the primary air passes through an air heater and is termed the "hot" air. Upstream of the pulverizer, the hot air, which passes through a regulating damper, and the "cold" air, which also passes through a regulating damper, are mixed. The quantity and temperature requirements of the primary air stream are met by adjusting the dampers in the hot and "cold" air supply conduits.

In the prior art the temperature of the fuel stream leaving the pulverizer was measured and compared with a desired value. Simultaneously, the quantity of air entering the pulverizer was sensed and also compared with a desired value. The net effect of any temperature errors and air flow errors was applied to both the hot and "cold" air dampers which were repositioned until both temperature and air flow returned to their desired values. In exercising this control in the prior art, an air flow error would cause both dampers to move in the same direction whereas a temperature error would cause the hot air and "cold" air dampers to move in opposite directions. Thus, in summary, in the prior art each of the hot and "cold" air dampers has been operated in response to both air flow and temperature errors. As will be discussed in more detail below, this is not altogether desirable since the characteristics of the two variable; i.e., air flow and temperature; are different. For example, flow control may be effected at a much faster rate than temperature control. Accordingly, it has been common practice in the art to "tune" both controllers whereby their reaction times would be commensurate with the average rate of change of temperature which is the variable which changes at the slowest rate.

The prior art pulverizer air flow and temperature controls provide satisfactory performance when transients are slow and the primary air system is able to simultaneously satisfy both air flow and temperature requirements. However, should a conflict arise, the prior art systems are not capable of determining which variable; i.e., temperature or flow; should dominate. Transients may, for example, result from a sudden change in coal moisture incident to a change from one supply bunker to another. An operating transient may also occur if the load on the air heater changes as a function of the number of pulverizers in operation. Poor transient response may be manifested by a failure to maintain the minimum required air flow. Should the air flow momentarily fall below that level required to transport the coal, some of the pulverized coal will "fall out" in the pipes downstream of the pulverizer thus presenting a fire hazard when hot air later flows through the pipes. If the temperature is insufficient to dry the coal, the coal will not be ground properly and the pulverizer will "spill"; i.e., the coal will not be entrained in the air stream. Obviously, if the input air temperature to the pulverizer is too high, a fire hazard is presented. As implicit in the preceeding remarks, pulverizer operation requires that air flow be kept above a minimum commensurate with transport velocity while maintaining a temperature which is adequate to dry the coal but not so high as to present a fire hazard.

Prior pulverizer air flow and temperature controls have, in addition to poor transient response as discussed above, possessed operating limitations. Again by way of example, if insufficient hot air was available, the hot air damper was driven to the open setting as the control tried to maintain air flow and temperature at the chosen values. When the desired values of both air flow and temperatue could not be achieved or maintained, prior pulverizer controls would function so that either one or the other of the variables; i.e., either temperature or air flow; would dominate. The parameter which dominates, however, is not always the right parameter taking all of the operating conditions into account.

SUMMARY OF THE INVENTION

The present invention overcomes the above-discussed and other deficiencies and disadvantages of the prior art by providing a novel and improved technique for controlling the quantity and temperature of the air delivered to a coal mill. The present invention also contemplates apparatus for use in practice of this novel method whereby a pair of input constituents are independently controlled prior to mixing so as to provide a fluid stream having the desired characteristics for, by way of example, drying and entraining particulate material.

Apparatus in accordance with a preferred embodiment of the present invention, when associated with an air flow and temperature control for a coal mill, adjusts a "hot" air regulator in response only to temperature errors and adjusts a "cold" air regulator primarily in response to air flow errors. Thus, if the coal mill outlet temperature drops below a preselected set point, the hot air regulator will be driven in the open direction. Simultaneously, the normal air flow set point will be biased downwardly; i.e., in the direction of lesser air flow; by the temperature error. This bias will cause the flow controller to drive the "cold" air regulator in the closed direction whereby the response of the control to temperature errors is much more rapid than has characterized prior art pulverizer controls. A controller in accordance with the present invention also includes a minimum flow limit selector which prevents the air flow set point from being driven below a preselected percentage of the normal air flow value. Also in accordance with the invention, a rapid drop in air flow will result in the hot air damper being temporarily driven in the open direction at a rate which is proportional to the rate of change of the air flow whereby coal "fall out" is prevented.

The present invention thus contemplates a control technique for a pulverizer wherein air flow control takes precedence over temperature control when actual air flow is below a preselected percentage of the normal desired value. Whenever the air flow volume is above the preselected desired value temperature control takes precedence over flow control.

BRIEF DESCRIPTION OF THE DRAWING

The present invention may be better understood and its numerous objects and advantages will become apparent to those skilled in the art by reference to the accompanying drawing which is a functional block diagram of a preferred embodiment.

DESCRIPTION OF THE PREFERRED EMBODIMENT

With reference now to the drawing, a coal mill or pulverizer is indicated generally and schematically at 10. It will be understood that, in actual practice, the air flow and temperature control of the present invention will adjust the supply of air to a pluraity of pulverizers with the number of pulverizers in operation at any one time being determined by the load on the furnace to which the fuel stream which exits from the pulverizers is delivered. The "primary" air is delivered to pulverizer 10 via conduit 12 while the fuel stream; i.e., the coal-air mixture; exits pulverizer 10 and is delivered to the burners of a furnace via a coal pipe 14.

A temperature sensor 16 measures the temperature of the coal-air mixture in coal pipe 14 immediately downstream of pulverizer 10. Temperature sensor 16 provides an electrical output signal commensurate with the fuel stream temperature. The fuel stream temperature will be a function of the temperature of the primary air delivered to pulverizer 10 via conduit 12 and the characteristics, particularly the moisture content, of the coal being ground in the pulverizer.

A flow sensor 18, which includes a probe 18', is employed to measure the volume of primary air being delivered to pulverizer 10 at a point in conduit 12 immediately upstream of the pulverizer. Flow sensor 18 will provide an electrical output signal commensurate with the quantity of primary air entering the pulverizer per unit of time.

At a point upstream of flow sensor probe 18', conduit 12 branches into a hot air supply conduit 20 and a "cold" air supply conduit 22. In accordance with conventional prior art practice, hot air conduit 20 will be connected to a source of heated air, not shown, which includes an air preheater associated with the furnace to which the fuel mixture in coal pipe 10 is being delivered. A flow regulator, indicated schematically as a damper type valve 22, is positioned in hot air conduit 20 upstream of the junction of the hot and "cold" air conduits for adjusting the quantity of hot air delivered to the primary air conduit 12. The position of valve 24 is depicted as being controlled by means of an electric motor 26 and it will be understood that other type actuators such as hydraulic cylinders may be employed. Similarly, a flow regulator or damper 28 is installed in the "cold" air conduit 22 upstream of the mixing point of the hot and "cold" air. Flow regulator 28 is also controlled by a suitable actuator such as electric motor 30. The upstream end of "cold" air conduit 22 will typically be connected, via a suitable blower or blowers, to the ambient atmosphere.

The desired air flow may be selected by means of a flow select circuit 32. Similarly, a minimum flow limit may be selected by means of a second selector circuit 34. Flow selector circuits 32 and 34 will provide electrical output signals which have a characteristic, amplitude for example, commensurate with the selected mass flow rates. The control of the present invention also includes a temperature selector circuit 36 whereby the desired fuel stream temperature may be entered into the control by the operator; temperature select circuit 36 being a commercially available device which is typically identical in nature to flow selectors 32 and 34.

The signal commensurate with actual fuel stream temperature, as provided by temperature sensor 16, and the signal commensurate with the desired temperature, as provided by temperature selector 36, are connected as inputs to a comparator circuit 38. Comparator 38 will provide an output signal commensurate with any instantaneous temperature error; this output signal typically having an average amplitude and a polarity which indicates whether the fuel stream temperature is above or below the desired level and, if so, the magnitude of the error. The temperature error signal from comparator 38 is delivered, via an inverter 40, to a weighting circuit 42. Weighting circuit 42 may merely comprise an amplifier which produces the appropriate response of "cold" air regulator 28 by varying the air flow set point in the manner to be described below. The proper proportioning of the temperature error signal will typically be determined from field tests. The temperature error signal from comparator 38 is also delivered to a proportional/integral controller 44.

The desired flow signal from flow selector circuit 32 is delivered to a summing circuit 46. The inverted and weighted error signal, from weighting circuit 42, is also delivered to summing circuit 46. Accordingly, the desired normal flow signal is biased by a signal which is a function of temperature error. The thus biased desired flow set point is applied as a first input to an auctioneering circuit 48 wherein it is compared with a signal commensurate with the preset minimum flow level as provided by selector circuit 34. The larger of the input signals to auctioneering circuit 48; i.e., the signal commensurate with the greater primary air flow rate; is applied as a first input to a comparator circuit 50.

The signal commensurate with actual flow, as provided by flow sensor 18, comprises the second input to comparator 50. The output of comparator 50, which is delivered to a proportional plus integral controller 52, is a flow error signal which is a function of any existing temperature error. The output of proportional/integral controller 52 is delivered, in the manner well known in the art, to the damper control motor 30 via an automatic/manual selector 54. Selector circuit 54 merely allows the operator to assume manual control over the positioning of damper 28.

The signal commensurate with actural flow, as provided by flow sensor 18, is also delivered as a first input to a further comparator circuit 56. The second input to comparator 56 is the selected minimum flow signal from selector circuit 34. The output of comparator circuit 56 will be a signal having a polarity which is indicative of whether the actual flow is above or below the selected minimum limit. Thus, by way of example, the appearance of a positive signal at the output of comparator 56 typically will indicate that the air flow is above the minimum limit set by selector circuit 34. The output of comparator 56 is delivered to a polarity sensitive circuit 58 which may, for example, comprise merely a switch or a linear amplifier. Circuit 58 will provide an output signal to a differentiator circuit 60 whenever the actual air flow is below the preselected minimum. Thus, differentiation circuit 60 will receive an input signal commensurate with flow error only when actual flow is below the preselected minimum.

The output signals from differentiator circuit 60, which vary as a function of the rate of change of flow, are applied as a first input to a summing circuit 62. Summing circuit 62 receives, as its second input, the output of the proportional plus integral controller 44 which, as noted above, receives the temperature error signal from comparator 38. The output of summing circuit 62 will be applied, via an automatic/manual selector circuit 64, to the drive motor 26 for the hot air damper 24.

Under normal operating conditions, with the measured air flow above the selected minimum limit, the only input to summing circuit 62 will be the temperature error from proportional/integral controller 44 and thus damper 24 will be controlled solely as a function of temperature error so long as flow remains above the selected minimum. However, should flow drop below the selected minimum, an additional control signal will be applied to summing circuit 62 from differentiator 60. This additional control signal will result in the hot air damper 24 being rapidly driven in the open direction. The cold air damper 28 will also be driven in the open direction by the output of selector circuit 34, which is chosen by auctioneering circuit 48, should flow fall below the selected minimum.

In a typical installation, the system will have a maximum air flow capability in the range of 120–150% of the normal air flow. Also, the minimum air flow required to transport coal through coal pipe 14 will be approximately 70% of the normal level. Under these circumstances, the minimum air flow set point will be selected to be approximately 80% of normal. Thus, in operation, any time the actual air flow is below 80% level, air flow control will take precedence over temperature control and the hot air damper 24 will be driven in the open direction as a consequence of the application to summing circuit 62 of an output signal from differentiator 60. However, if the measured air flow is above the set point level, temperature control will take precedence and the hot air damper will be adjusted solely as a function of a temperature error while the cold air damper will be adjusted as a function of flow with the normal flow set point being biased by any temperature error. Thus, under normal operating conditions, the flow of hot air to the primary air conduit 12 will be varied only in response to temperature error while the delivery of "cold" air to conduit 12 is primarily a function of flow errors with the normal set point against which actual flow is compared being biased by any existing temperature error. This technique permits each control; i.e., the circuitry for operating the hot and "cold" air dampers; to be "tuned" for a single variable.

To summarize operation, if the pulverizer outlet temperature as measured in coal pipe 14 drops below the set point commensurate with the output of temperature select circuit 36, the hot air damper will be driven in the open direction via the action of proportional/integral controller 44. Simultaneously, the temperature error will bias the air flow set point, as it appears at the output of summing circuit 46, in the downward direction as a result of the combined action of inverter 40 and weighting circuit 42 on the output of comparator 38. The bias signal applied to summing circuit 46 thus ultimately results in the "cold" air damper 28 being driven in the closed direction. The net effect of the driving of the hot and "cold" air dampers in opposite directions upon occurrence of a temperature error is to provide very rapid response to a temperature upset at the expense of driving the air flow from its normal value. However, the effect of selector circuit 48 is to prevent the air flow set point from being driven below the selected minimum limit which would be 80% of the normal air flow level in the example discussed above.

Should the measured air flow increase above the selected normal level, as determined by the output of selector circuit 32, normal control action will result with the hot and "cold" air dampers respectively being positioned as a function of temperature and flow error. However, if the measured air flow falls at a rapid rate and is below the minimum air flow set point value, the hot air damper 24 will be temporarily driven in the open direction by the output signal from differentiator 60.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. A method for controlling the quantities of at least two constituents of a fluid mixture delivered to a mixing point in response to measured parameters of the mixture comprising the steps of:

selecting normal values for first and second parameters of the mixture;

selecting a desired minimum value for the mixture second parameter;

measuring the actual value of the mixture first parameter;

comparing the measured and selected normal values of the mixture first parameter;

adjusting the flow of the first constituent to compensate for any difference between the measured actual and selected normal values of the mixture first parameter when the mixture second parameter is above the selected desired minimum value;

modifying the selected value of the mixture second parameter as a function of any difference between the measured actual and selected normal values of the mixture first parameter;

measuring the actual value of the mixture second parameter;

comparing the measured and modified selected values of the mixture second parameter;

adjusting the flow of the second constituent to compensate for any difference between the measured actual and modified selected values of the mixture second parameter when the second parameter is above the selected desired minimum value;

adjusting the flow of the first constituent as a function of the rate of change of the second parameter when the second parameter is below the selected desired minimum value;

comparing the measured and actual selected desired minimum values of the mixture second parameter when the second parameter is below the desired minimum; and adjusting the flow rate of the second constituent to compensate for any difference between the measured actual and selected minimum values when the flow rate is below the selected minimum value.

2. The method of claim 1 wherein the mixture first parameter is temperature and wherein said first constituent is at a higher temperature than the second constituent.

3. The method of claim 2 wherein said second parameter is mass flow rate.

4. The method of claim 3 wherein the flow of the first constituent is varied at a rate proportional to the rate of change of the mass flow rate of the mixture when the measured mass flow rate is below the selected minimum flow rate.

5. The method of claim 4 wherein the mixture is a particle laden air stream and said first and second constituents respectively comprise preheated and ambient air.

6. The method of claim 1 wherein the mixture consists of a fuel stream comprising dry pulverized coal entrained in air, the first and second constituents respectively comprise preheated and ambient air and the mass flow rates of the preheated and ambient are adjusted in opposite directions when the actual value of the mass flow rate is above the minimum selected value.

7. Apparatus for controlling the delivery of air to a coal pulverizer, the pulverizer including supplies of pressurized, preheated and unheated transport air and providing a mixture including dry pulverized coal entrained in air, said control apparatus comprising:

means for generating a signal commensurate with a desired temperature of the coal-air mixture provided by the pulverizer;

means for providing a signal commensurate with the actual temperature of the coal-air mixture provided by the pulverizer;

means for generating a signal commensurate with a desired normal rate of flow of air to the pulverizer;

means for providing a signal commensurate with the actual rate of flow of air to the pulverizer;

means responsive to the signals commensurate with actual and desired mixture temperature for generating a first flow error signal;

means responsive to said first flow error signal for adjusting the flow of the preheated air as a direct function of temperature error;

means responsive to said first error signal and said signal commensurate with desired flow rate for generating a desired flow rate signal which varies inversely with temperature error;

means for comparing said signals commensurate with inversely variable desired flow rate and actual flow rate for generating a second error signal, said second error signal varying directly with flow error and inversely with temperature error; and means responsive to said second error signal for causing a variation in the flow of said unheated air to the pulverizer.

8. The apparatus of claim 7 further comprising:

means for generating a signal commensurate with a minimum desired rate of flow of air to the pulverizer;

means for comparing the signals commensurate with minimum desired and actual flow rates for generating a flow error signal which is proportional to rate of change of flow when actual air flow to the pulverizer is below the preselected minimum; and means for applying said proportional flow error signal to said means for adjusting the flow of preheated air whereby the preheated air flow will be increased when actual flow is below the desired minimum.

9. The apparatus of claim 7 further comprising:

means for selecting the one of the minimum desired and inversely variable flow rate signals corresponding to the greater pulverizer input mass flow rate; and means for delivering the selected flow rate signal passed by said selecting means to said second error signal generating means for comparison with the actual flow rate signal.

10. The apparatus of claim 8 further comprising:

means for selecting the one of the minimum desired and inversely variable flow rate signals corresponding to the greater pulverizer input mass flow rate; and means for delivering the selected flow rate signal passed by said selecting means to said second error signal generating means for comparison with the actual flow rate signal.

* * * * *